(12) United States Patent
Gagnon et al.

(10) Patent No.: US 11,144,019 B2
(45) Date of Patent: Oct. 12, 2021

(54) ENVIRONMENT CONTROLLER AND METHOD FOR CONTROLLING AN ENVIRONMENTAL CHARACTERISTIC IN AN AREA BASED ON CONCURRENT BLE REQUESTS

(71) Applicant: Distech Controls Inc., Brossard (CA)

(72) Inventors: Dominic Gagnon, St-Bruno-de-Montarville (CA); Martin Demers, Ange-Gardien (CA); Marc Legault, Brossard (CA)

(73) Assignee: DISTECH CONTROLS INC., Brossard (CA)

( * ) Notice: Subject to any disclaimer, the term of this patent is extended or adjusted under 35 U.S.C. 154(b) by 57 days.

(21) Appl. No.: 16/437,563

(22) Filed: Jun. 11, 2019

(65) Prior Publication Data
US 2019/0391543 A1 Dec. 26, 2019

Related U.S. Application Data

(60) Provisional application No. 62/687,472, filed on Jun. 20, 2018.

(51) Int. Cl.
| | |
|---|---|
| *G05B 15/02* | (2006.01) |
| *G05D 23/19* | (2006.01) |
| *F24F 11/30* | (2018.01) |
| *F24F 8/10* | (2021.01) |

(52) U.S. Cl.
CPC .............. *G05B 15/02* (2013.01); *F24F 8/10* (2021.01); *F24F 11/30* (2018.01); *G05D 23/1905* (2013.01); *G05B 2219/2614* (2013.01); *G05B 2219/2642* (2013.01)

(58) Field of Classification Search
None
See application file for complete search history.

(56) References Cited

PUBLICATIONS

Robert Davidson et al., "Getting Started with Bluetooth Low Energy," Chapter 4. GATT (Services and Characteristics), Safari Books Online, Copyright © 2018, 24 pages.

*Primary Examiner* — Carlos R Ortiz Rodriguez
(74) *Attorney, Agent, or Firm* — RatnerPrestia

(57) ABSTRACT

Environment controller and method for controlling an environmental characteristic in an area of a building based on concurrent BLE requests. The environment controller receives a plurality of concurrent environmental characteristic target values originating from a plurality of BLE enabled user devices. The plurality of concurrent environmental characteristic target values is forwarded from the plurality of BLE enabled user devices to the environment controller via one or more BLE proxy device. The environment controller applies an algorithm to generate one or more command for controlling at least one controlled appliance based on the plurality of concurrent environmental characteristic target values. The environment controller further transmits the one or more command to the at least one controlled appliance. Examples of concurrent environmental characteristic target values include target temperatures, target humidity levels, target $CO_2$ levels, target lightning levels, etc.

20 Claims, 7 Drawing Sheets

ENVIRONMENT CONTROLLER AND METHOD FOR CONTROLLING AN ENVIRONMENTAL CHARACTERISTIC IN AN AREA BASED ON CONCURRENT BLE REQUESTS

RELATED APPLICATIONS

This application claims priority to U.S. Provisional Application No. 62/687,472, Filed Jun. 20, 2018 entitled "ENVIRONMENT CONTROLLER AND METHOD FOR CONTROLLING AN ENVIRONMENTAL CHARACTERISTIC IN AN AREA BASED ON CONCURRENT BLE REQUESTS," the disclosure of which is entirely incorporated herein by reference.

TECHNICAL FIELD

The present disclosure relates to the field of building automation, and more precisely environmental condition control in an area of a building. More specifically, the present disclosure presents an environment controller and a method for controlling an environmental characteristic in an area of the building based on concurrent Bluetooth® Low Energy (BLE) requests.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from external sensors, and in turn determines set-points or command parameters to be sent to controlled appliances.

Communications between an environment controller and the devices under its control (sensors, controlled appliances, etc.) were traditionally based on wires. The wires are deployed in the building where the environment control system is operating, for instance in the walls, ceilings, and floors of multiple rooms in the building. Deploying wires in a building is usually disrupting for the daily operations in the building and costly. Thus, recently deployed environment controllers and devices under their control (sensors, controlled appliances, etc.) are using one or more wireless communication protocol (e.g. Wi-Fi, mesh, etc.) to exchange environmental data.

The environment controller and the devices under its control (sensors, controlled appliances, etc.) are generally referred to as Environment Control Devices (ECDs). An ECD comprises processing capabilities for processing data received via one or more communication interface and/or generating data transmitted via the one or more communication interface. Each communication interface may be of the wired or wireless type.

The generalization of the Bluetooth® Low Energy (BLE) standard allows BLE enabled user devices (e.g. a smartphone or a tablet) to interact with ECDs of an environment control system which also support the BLE standard.

The BLE enabled user devices can be used to transmit requests through the BLE protocol, to modify an environmental characteristic in a room (or a floor) of a building. For example, the request includes a target temperature or a target humidity level for the room (or the floor). The environment control system takes into consideration the requests sent by the BLE enabled user devices to control the temperature or humidity level in the room (or the floor).

However, environment control systems have not been designed to manage the reception of a plurality of concurrent requests from a plurality of BLE enabled user devices requesting a modification of the same environmental characteristic (e.g. two concurrent requests to set the temperature to 20 degrees Celsius and 24 degrees Celsius).

Therefore, there is a need for an environment controller and a method for controlling an environmental characteristic in an area of a building based on concurrent BLE requests.

SUMMARY

According to a first aspect, the present disclosure relates to an environment controller for controlling an environmental characteristic in an area based on concurrent Bluetooth® Low Energy (BLE) requests. The environment controller comprises at least one communication interface and a processing unit. The processing unit receives via the at least one communication interface a plurality of concurrent environmental characteristic target values originating from a plurality of BLE enabled user devices. The plurality of concurrent environmental characteristic target values is forwarded from the plurality of BLE enabled user devices to the environment controller via one or more BLE proxy device. The processing unit applies an algorithm to generate one or more command for controlling at least one controlled appliance based on the plurality of concurrent environmental characteristic target values. The processing unit further transmits the one or more command to the at least one controlled appliance via the at least one communication interface.

According to a second aspect, the present disclosure relates to a method for controlling an environmental characteristic in an area based on concurrent BLE requests. The method comprises receiving by a processing unit of an environment controller via at least one communication interface of the environment controller a plurality of concurrent environmental characteristic target values originating from a plurality of BLE enabled user devices. The plurality of concurrent environmental characteristic target values is forwarded from the plurality of BLE enabled user devices to the environment controller via one or more BLE proxy device. The method comprises applying by the processing unit of the environment controller an algorithm to generate one or more command for controlling at least one controlled appliance based on the plurality of concurrent environmental characteristic target values. The method further comprises transmitting by the processing unit of the environment controller the one or more command to the at least one controlled appliance via the at least one communication interface of the environment controller.

According to a third aspect, the present disclosure relates to a non-transitory computer program product comprising instructions executable by a processing unit of an environment controller. The execution of the instructions by the processing unit of the environment controller provides for controlling an environmental characteristic in an area based on concurrent BLE requests, by implementing the aforementioned method.

In a particular aspect, the area is an area of a building.

BRIEF DESCRIPTION OF THE DRAWINGS

Embodiments of the disclosure will be described by way of example only with reference to the accompanying drawings, in which.

DETAILED DESCRIPTION

Figure 1:
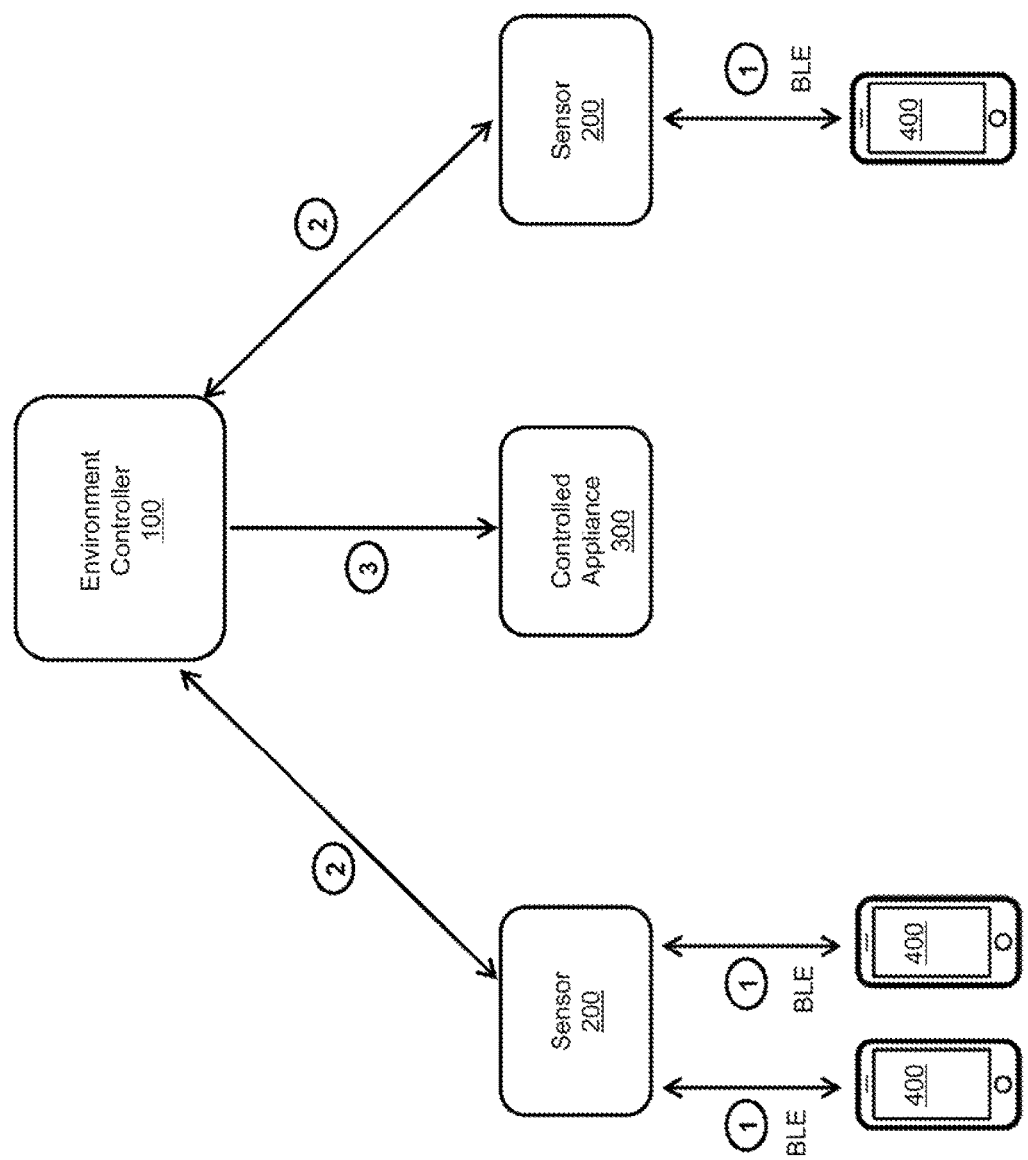
FIGS. 1, 2 and 3 represent interactions between devices of an environment control system comprising an environment controller and several BLE enabled user devices.

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for controlling an environmental characteristic in an area of a building based on concurrent BLE requests originating from multiple BLE enabled user devices.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, CO2, flow, radiation, water level, speed, sound; a variation of at least one of the following, temperature, pressure, humidity and lighting, CO2 levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Relay: device capable of relaying an environmental characteristic value from a sensor to an environment controller and/or relaying a command from an environment controller to a controlled appliance.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: the expression 'area of a building' is used throughout the present specification to refer to the interior of a whole building or a portion of the interior of the building such as, without limitation: a floor, a room, an aisle, etc.

BLE proxy device: a computing device having a BLE interface and another communication interface, and performing data forwarding between the BLE interface and the other communication interface. The BLE proxy device receives data via the BLE interface and transmits them via the other communication interface. The BLE proxy device receives data via the other communication interface and transmits them via the BLE interface. The BLE interface uses the BLE protocol for receiving and transmitting the data.

Referring now concurrently to FIGS. 1, 2, 3, 4, 5, 6 and 7, an environment controller 100 and a method 600 for controlling an environmental characteristic in an area of a building based on concurrent BLE requests are illustrated.

Figure 2:
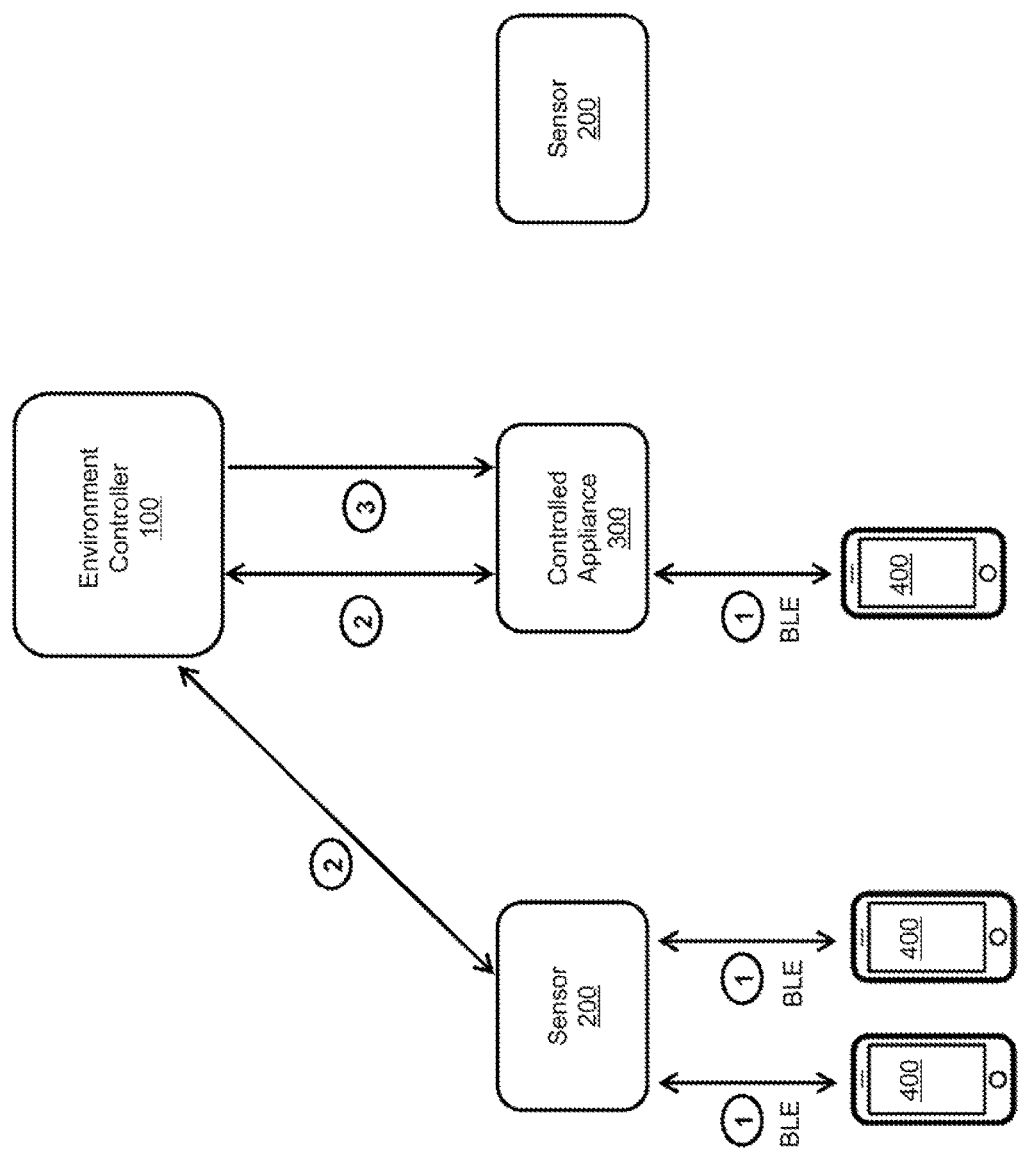
Figure 3:
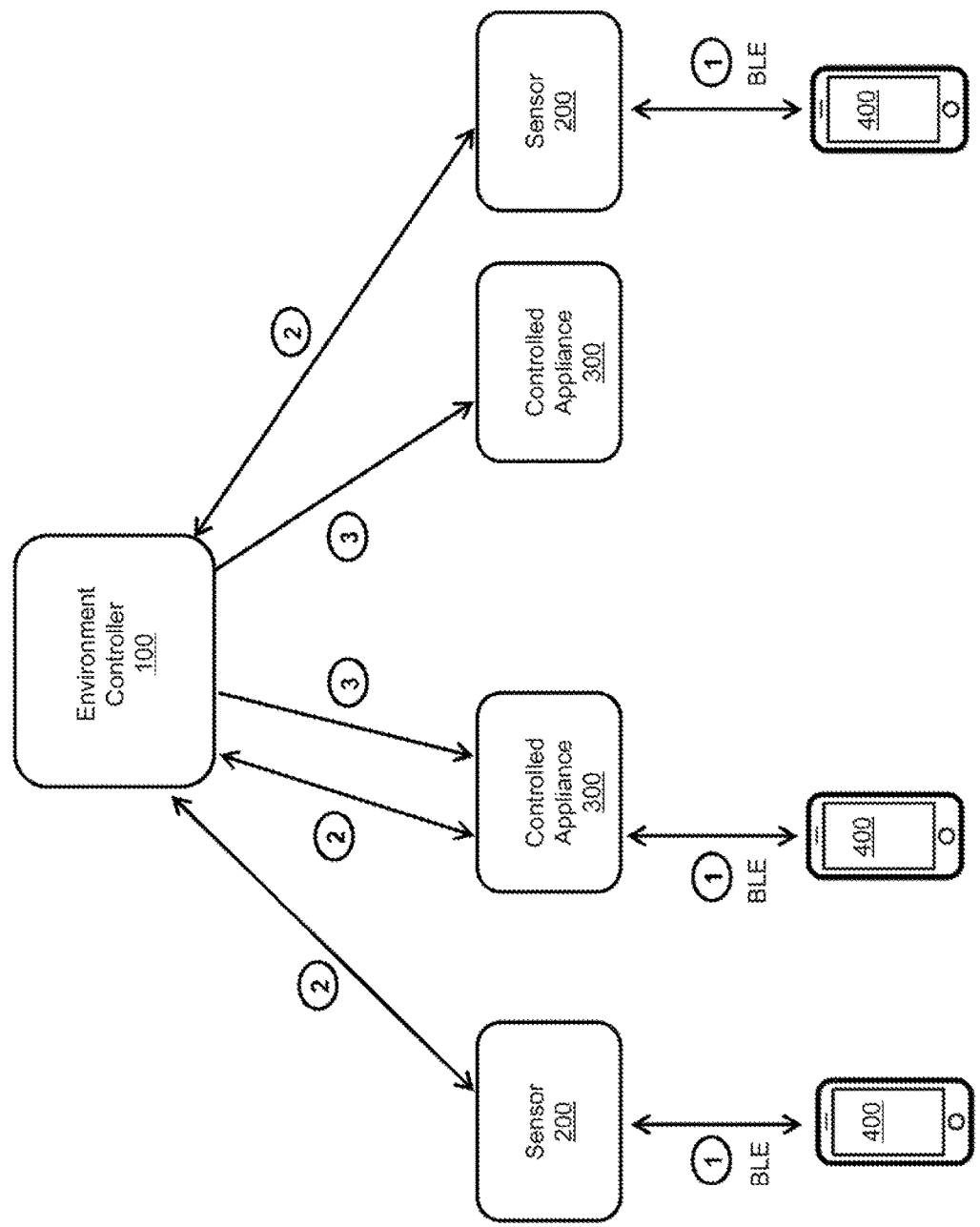

FIGS. 1, 2, 3 represent an environment control system where an environment controller 100 exchanges data with other environment control devices (ECDs). The environment controller 100 is responsible for controlling the environment of an area of a building. The environment controller 100 receives from sensors 200 environment characteristic values measured by the sensors 200. The environment controller 100 generates commands based on the received environment characteristic values. The generated commands are transmitted to controlled appliances 300 (to control the operations of the controlled appliances 300).

The area under the control of the environment controller 100 is not represented in the Figures for simplification purposes. As mentioned previously, the area may consist of a room, a floor, an aisle, etc. (of a building). However, the area under the control of the environment controller 100 is not limited to being inside a building. Outdoor areas such as a street, a parking lot, a stadium, a private outdoor space surrounding a building, etc. also fall within the scope of the present disclosure.

Examples of sensors 200 include a temperature sensor, capable of measuring a current temperature and transmitting the measured current temperature to the environment controller 100. The examples also include a humidity sensor, capable of measuring a current humidity level and transmitting the measured current humidity level to the environment controller 100. The examples further include a carbon dioxide (CO2) sensor, capable of measuring a current CO2 level and transmitting the measured current CO2 level to the environment controller 100. The examples also include a lightning sensor, capable of measuring a current lightning level in the area and transmitting the measured lightning level to the environment controller 100. The examples further include an occupancy sensor, capable of determining a current occupancy of the area and transmitting the determined current occupancy of the area to the environment controller 100.

The aforementioned examples of sensors 200 are for illustration purposes only. Other types of sensors 200 could be used in the context of an environment control system managed by the environment controller 100. Furthermore, each environmental characteristic value measured by a sensor 200 may consist of either a single value (e.g. current temperature of 25 degrees Celsius), or a range of values (e.g. current temperature in the range of 25 to 26 degrees Celsius).

Only two sensors 200 are represented in FIGS. 1, 2, 3 for simplification purposes. However, any number of sensors 200 and any types of sensors 200 (temperature, humidity level, CO2 level, etc.) may be deployed in the area under the control of the environment controller 100.

Furthermore, in some cases, a single sensor 200 measures a given type of environment characteristic value (e.g. temperature) for the whole area. Alternatively, the area is divided into a plurality of zones, and a plurality of sensors 200 measures the given type of environment characteristic value (e.g. temperature) in the corresponding plurality of zones.

Each controlled appliance 300 comprises at least one actuation module, to control the operations of the controlled appliance 300 based on the commands received from the environment controller 100. The actuation module can be of one of the following type: mechanical, pneumatic, hydraulic, electrical, electronical, a combination thereof, etc. The commands control operations of the at least one actuation module.

An example of a controlled appliance 300 consists of a VAV appliance. Examples of commands transmitted to the VAV appliance 300 include commands directed to one of the following: an actuation module controlling the speed of a fan, an actuation module controlling the pressure generated by a compressor, an actuation module controlling a valve defining the rate of an airflow, etc. This example is for illustration purposes only. Other types of controlled appliances 300 could be used in the context of an environment control system managed by the environment controller 100.

At least some of the sensors 200 and controlled appliances 300 represented in FIGS. 1-3 are capable of exchanging data with user devices 400 through the BLE protocol. The BLE protocol provides short range wireless interactions between electronic equipment having a communication interface supporting the BLE standard.

The sensors 200 and controlled appliances 300 capable of interactions through the BLE protocol will be referred to as BLE enabled sensors and BLE enabled controlled appliances. The user devices 400 capable of interactions through the BLE protocol will be referred to as BLE enabled user devices.

Examples of BLE enabled user devices 400 include smartphones, tablets, smartwatches, laptops, etc. More generally, any computing device comprising a BLE communication interface and having a form factor allowing (relative) mobility of the computing device qualifies as an end user device 400.

Since the BLE standard only provides short range wireless interactions, BLE enabled user devices 400 would not be capable of interacting with a BLE enabled environment controller 100 unless the BLE enabled user devices 400 are very close to the BLE enabled environment controller 100. Therefore, a BLE enabled environment controller 100 would provide very limited (in terms of range) interactions with BLE enabled user devices 400.

Therefore, the BLE enabled sensors 200 and the BLE enabled controlled appliances 300 act as a proxy between the environment controller 100 and the BLE enabled user devices 400. More details related to the implementation of this proxy functionality will be provided later in the description in relation to FIG. 5. Furthermore, the terminology BLE proxy device will be introduced later in the description in relation to FIG. 4, to describe any BLE enabled computing device providing this proxy functionality. The BLE proxy devices include the BLE enabled sensors 200 and the BLE enabled controlled appliances 300 of FIGS. 1-3; but are not limited to these types of devices.

Environmental data generated or stored by the environment controller 100 are transmitted to BLE enabled sensors 200 and/or BLE enabled controlled appliances 300. The environmental data are forwarded by the BLE enabled sensors 200 and/or BLE enabled controlled appliances 300 to the user devices 400 using the BLE protocol. The end user devices 400 have displays for displaying the environmental data.

The end user devices 400 also have user interfaces for generating environmental data (e.g. commands, set points, etc.), which are transmitted to the BLE enabled sensors 200 and/or BLE enabled controlled appliances 300 using the BLE protocol. The environmental data are forwarded by the BLE enabled sensors 200 and/or BLE enabled controlled appliances 300 to the environment controller 100.

The exchange of environmental data using the BLE protocol between the end user devices 400 and the BLE enabled sensors 200 and/or BLE enabled controlled appliances 300 are represented with the reference number 1 in FIGS. 1-3 (and the other Figures if applicable).

The exchange of environmental data using a communication protocol different from the BLE protocol (or at least tunneling datagrams compliant with the BLE standard via another protocol, as will be illustrated later in reference to FIG. 5) between the environment controller 100 and the BLE enabled sensors 200 and/or BLE enabled controlled appliances 300 are represented with the reference number 2 in FIGS. 1-3 (and the other Figures if applicable).

The transmission of commands (using a communication protocol different from the BLE protocol) from the environment controller 100 to the controlled appliances 300 are represented with the reference number 3 in FIGS. 1-3 (and the other Figures if applicable).

The present disclosure more specifically addresses the transmission (using the BLE protocol) of concurrent environmental characteristic target values from the end user devices 400 to the BLE enabled sensors 200 and/or BLE enabled controlled appliances 300. The concurrent environmental characteristic target values are forwarded by the BLE enabled sensors 200 and/or BLE enabled controlled appliances 300 to the environment controller 100.

At least two concurrent environmental characteristic target values are generated and transmitted by at least two end user devices 400. The at least two concurrent environmental characteristic target values are forwarded to and received by the environment controller 100. The environment controller 100 is configured to take into consideration the at least two concurrent environmental characteristic target values to generate one or more command for controlling at least one controlled appliance 300.

In an exemplary implementation, the environment controller 100 receives the concurrent environmental characteristic target values and memorizes all the concurrent environmental characteristic target values received during a pre-defined interval of time. When the pre-defined interval of time has elapsed, the environment controller 100 processes all the concurrent environmental characteristic target values received during a pre-defined interval of time to generate the command(s).

In another exemplary implementation, the environment controller 100 receives a first environmental characteristic target value and generates first command(s) based on the first environmental characteristic target value. If the environment controller 100 receives additional environmental characteristic target value(s) within a pre-defined interval of time after the generation of the first command(s), the environment controller 100 processes the first environmental characteristic target value and the additional environmental characteristic target value(s) to generate new command(s). The concurrent environmental characteristic target values consist of the first environmental characteristic target value and the additional environmental characteristic target value(s).

All the concurrent environmental characteristic target values represent the same type of environmental characteristic (e.g. concurrent target temperatures, concurrent target humidity levels, concurrent target $CO_2$ levels, concurrent target lightning levels, etc.).

As will be detailed later in the description, different algorithms can be implemented by the environment controller 100 for adequately addressing the concurrent expectations of the end users of the concurrent user devices 400 which have generated and transmitted the concurrent environmental characteristic target values.

FIG. 1 illustrates a first exemplary use case. Two user devices 400 respectively generate and transmit (using the BLE protocol) a first and a second environmental characteristic target values to a first BLE enabled sensor 200, which forwards the first and second environmental characteristic target values to the environment controller 100. A third user device 400 generates and transmits (using the BLE protocol) a third environmental characteristic target value to a second BLE enabled sensor 200, which forwards the third environmental characteristic target value to the environment controller 100. The environment controller 100 takes into consideration the three concurrent environmental characteristic target values to generate command(s) for controlling the controlled appliance 300.

FIG. 2 illustrates a second exemplary use case. Two user devices 400 respectively generate and transmit (using the BLE protocol) a first and a second environmental characteristic target values to a BLE enabled sensor 200, which forwards the first and second environmental characteristic target values to the environment controller 100. A third user device 400 generates and transmits (using the BLE protocol) a third environmental characteristic target value to a BLE enabled controlled appliance 300, which forwards the third environmental characteristic target value to the environment controller 100. The environment controller 100 takes into consideration the three concurrent environmental characteristic target values to generate command(s) for controlling the BLE enabled controlled appliance 300.

FIG. 3 illustrates a third exemplary use case. A first user device 400 generates and transmits (using the BLE protocol) a first environmental characteristic target value to a first BLE enabled sensor 200, which forwards the first environmental characteristic target value to the environment controller 100. A second user device 400 generates and transmits (using the BLE protocol) a second environmental characteristic target value to a BLE enabled controlled appliance 300, which forwards the second environmental characteristic target value to the environment controller 100. A third user device 400 generates and transmits (using the BLE protocol) a third environmental characteristic target value to a second BLE enabled sensor 200, which forwards the third environmental characteristic target value to the environment controller 100. The environment controller 100 takes into consideration the three concurrent environmental characteristic target values to generate command(s) for controlling the BLE enabled controlled appliance 300 and another controlled appliance 300.

It should be noted that the use cases represented in FIGS. 1-3 are for illustration purposes. Other configurations could also be supported. In particular, three concurrent environmental characteristic target values have been considered in FIGS. 1-3. However, any number greater than two of concurrent environmental characteristic target values may be considered.

For example, the three concurrent environmental characteristic target values of FIGS. 1-3 are the following concurrent target temperatures: 20, 22 and 25 degrees Celsius. The measured temperature of the area under the control of the environment controller is 19 degrees Celsius. The algorithm implemented by the environment controller 100 determines an enforceable target temperature based on the concurrent target temperatures: 20, 22 and 25 degrees Celsius. For example, the enforceable target temperature is 23 degrees Celsius. Then, the environment controller 100 generates command(s) for controlling a VAV appliance in order to raise the temperature of the area from the measured temperature of 19 degrees Celsius to the enforceable target temperature of 23 degrees Celsius.

Figure 4:
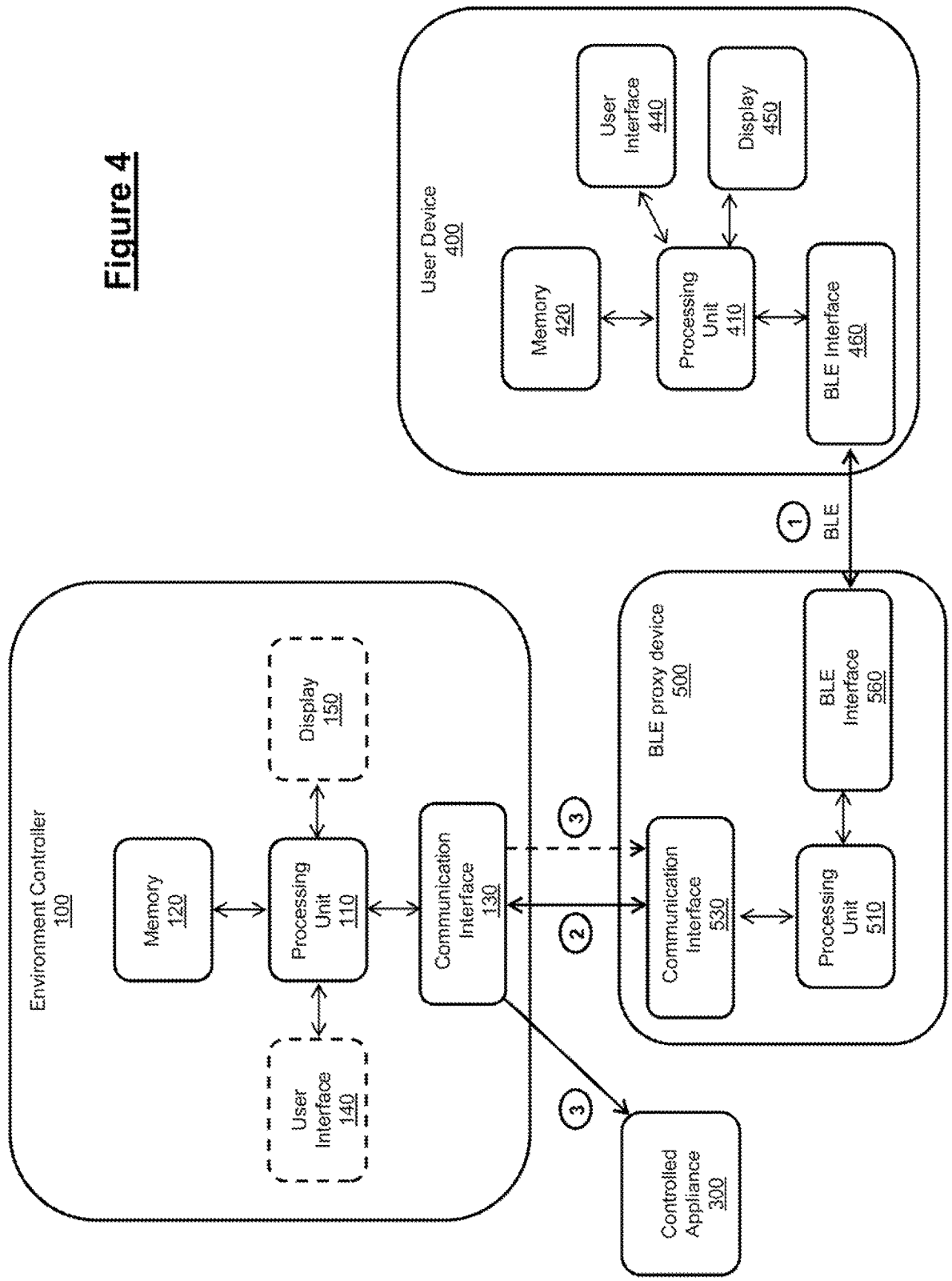
FIG. 4 represents a functional diagram detailing component of several devices of the environment control system of FIGS. 1-3.

Referring more specifically to FIG. 4, details of the environment controller 100, user device 400 and BLE proxy device 500 are provided. Although a single controlled appliance 300 is represented in FIG. 4 for simplification purposes, the environment controller 100 may be interacting with a plurality of controlled appliances 300. Similarly, although a single BLE proxy device 500 is represented in FIG. 4 for simplification purposes, the environment controller 100 may be interacting with a plurality of BLE proxy devices 500. Furthermore, although a single user device 400 is represented in FIG. 4 for simplification purposes, the BLE proxy device 500 may be interacting with a plurality of user devices 400.

The controlled appliance 300 represented in FIG. 4 has no BLE capabilities. The BLE proxy device 500 may consist of one of the following: one of the sensors 200 with BLE capabilities represented in FIGS. 1-3, one of the controlled appliances 300 with BLE capabilities represented in FIGS. 2-3, another computing device with BLE capabilities, etc. Additional sensors 200 with no BLE capabilities (not represented in FIG. 4 for simplification purposes) may be interacting with the environment controller 100.

The environment controller 100 comprises a processing unit 110, memory 120, and a communication interface 130. The environment controller 100 may comprise additional components, such as another communication interface (not represented in FIG. 4 for simplification purposes), a user interface 140, a display 150, etc.

The processing unit 110 comprises one or more processors (not represented in FIG. 4) capable of executing instructions of a computer program. Each processor may further comprise one or several cores.

The memory 120 stores instructions of computer program(s) executed by the processing unit 110, data generated by the execution of the computer program(s), data received via the communication interface 130 (or another communication interface), etc. Only a single memory 120 is represented in FIG. 4, but the environment controller 100 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 130 allows the environment controller 100 to exchange data with remote devices (e.g. controlled appliance 300, BLE proxy device 500, etc.) over a communication network (not represented in FIG. 4 for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network.

As mentioned previously, the environment controller 100 may include at least one additional communication interface (not represented in FIG. 4). For example, the environment controller 100 exchanges data with some of the controlled appliances 300 and BLE proxy devices 500 via the communication interface 130 using one of the 802.11 standards. The environment controller 100 exchanges data with other controlled appliances 300 and BLE proxy devices 500 via another communication interface using a wireless mesh standard.

The BLE proxy device 500 comprises a processing unit 510, memory (not represented in FIG. 4 for simplification purposes), a communication interface 530 not supporting the BLE standard, and a communication interface 560 supporting the BLE standard.

The BLE proxy device 500 may comprise additional components not represented in FIG. 4. For example, if the BLE proxy device 500 is one of the controlled appliances 300 with BLE capabilities represented in FIGS. 2-3, then the BLE proxy device 500 further comprises at least one actuation module. As mentioned previously, the actuation module can be of one of the following type: mechanical, pneumatic, hydraulic, electrical, electronical, a combination thereof, etc. Commands (reference number 3) received from the environment controller 100 via the communication interface 530 control operations of the at least one actuation module. In another example, if the BLE proxy device 500 is one of the sensors 200 with BLE capabilities represented in FIGS. 1-3, then the BLE proxy device 500 further comprises at least one sensing module for detecting an environmental characteristic. Environmental characteristic values (reference number 2) corresponding to the detected environmental characteristic are transmitted to the environment controller 100 via the communication interface 530.

The processing unit 510 comprises one or more processors (not represented in FIG. 4) capable of executing instructions of a computer program. Each processor may further comprise one or several cores.

The memory of the BLE proxy device 500 (not represented in FIG. 4 for simplification purposes) stores instructions of computer program(s) executed by the processing unit 510, data generated by the execution of the computer program(s), data received via the communication interfaces 530 and 560, etc. The BLE proxy device 500 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 530 allows the BLE proxy device 500 to exchange data (reference number 2) with the environment controller 100 over a communication network (not represented in FIG. 4 for simplification purposes). As mentioned previously, if the communication network is a wired communication network, such as an Ethernet network, the communication interface 530 is adapted to support communication protocols used to exchange data over the wired (e.g. Ethernet) network. If the communication network is a wireless communication network, such as a Wi-Fi network, the communication interface 530 is adapted to support communication protocols used to exchange data over the wireless (e.g. Wi-Fi) network. The communication interface 530 does not support the BLE standard.

The communication interface 560 allows the BLE proxy device 500 to exchange data (reference number 1) with the user device(s) 400 over a BLE network (not represented in FIG. 4 for simplification purposes). The communication interface 560 supports the BLE standard.

The user device 400 comprises a processing unit 410, memory 420, and a BLE interface 460 supporting the BLE standard. The user device 400 also comprises a user interface 440 and a display 450 for displaying the data (reference number 1) received from the BLE proxy device 500 via the BLE interface 460, and for generating the data (reference number 1) transmitted to the BLE proxy device 500 via the BLE interface 460. The user device 400 may comprise additional components, such as another communication interface (not represented in FIG. 4 for simplification purposes) not supporting the BLE standard (e.g. Wi-Fi interface, cellular interface, etc.).

The processing unit 410 comprises one or more processors (not represented in FIG. 4) capable of executing instructions of a computer program. Each processor may further comprise one or several cores.

The memory 420 stores instructions of computer program(s) executed by the processing unit 410, data generated by the execution of the computer program(s), data received via the BLE interface 460 (or another communication interface), etc. Only a single memory 420 is represented in FIG. 4, but the user device 400 may comprise several types of memories, including volatile memory (such as a volatile Random Access Memory (RAM), etc.) and non-volatile memory (such as a hard drive, electrically-erasable programmable read-only memory (EEPROM), etc.).

The BLE interface 460 supporting the BLE standard allows the user device 400 to exchange data (reference number 1) with the BLE proxy device 500.

Figure 5:
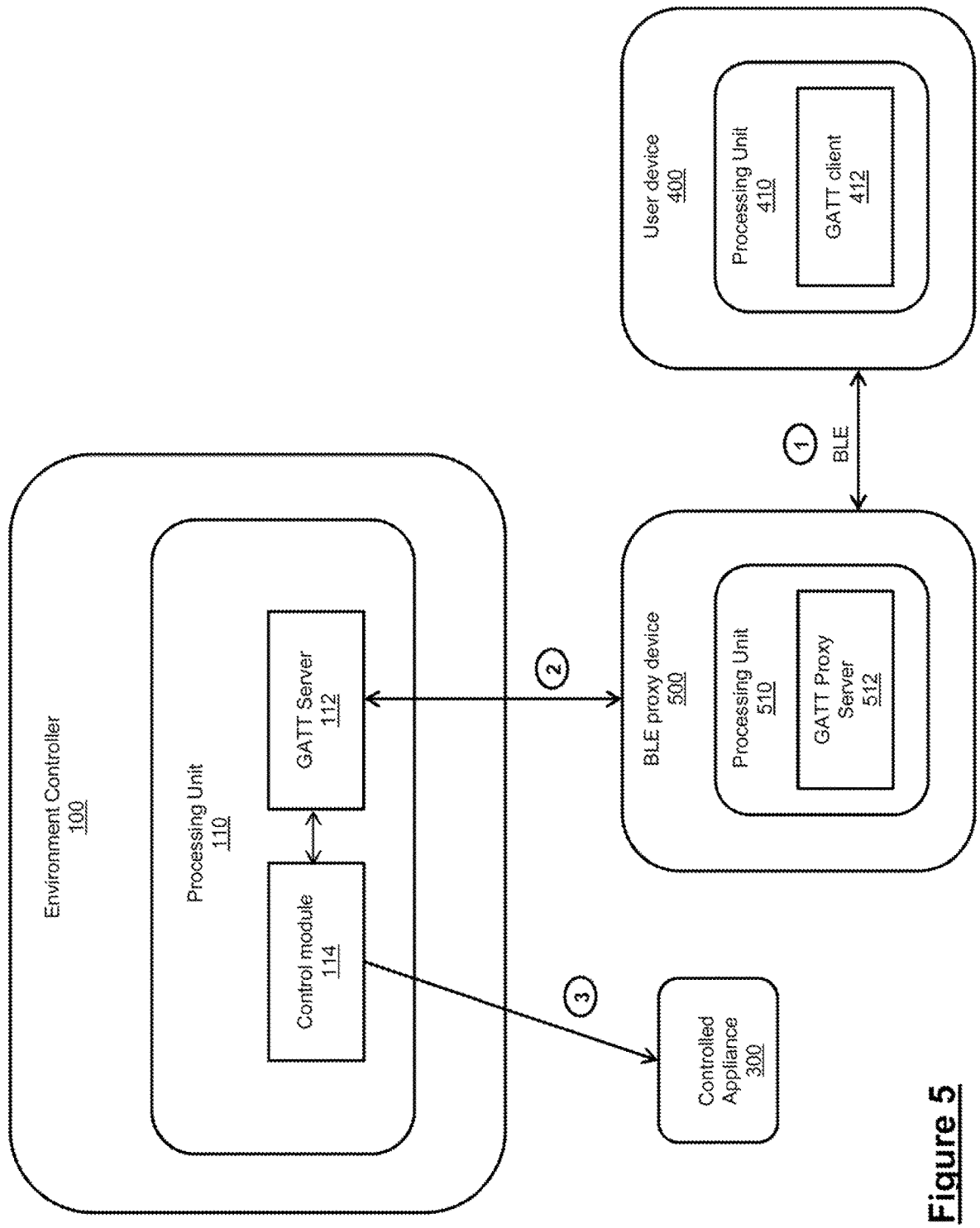
FIG. 5 represents functionalities implemented by the devices of FIG. 4 for supporting BLE interactions.

Referring more specifically to FIGS. 4 and 5, details of the interactions between BLE enabled devices will be provided.

The interactions between two BLE enabled devices are compliant with the Generic Attribute Profile (GATT), which defines how to exchange profile and user data over a BLE connection between the two BLE enabled devices. GATT deals only with data transfer procedures and formats; while the Generic Access Profile (GAP) defines the low-level interactions between the two BLE enabled devices.

One of the two BLE enabled devices operates as a GATT client. The GATT client sends requests to a GATT server and receives responses (and server-initiated updates) from it.

The GATT client first determines the presence and nature of those attributes by performing service discovery. After completing service discovery, it can then start reading and writing attributes found in the server, as well as receiving server-initiated updates.

The other one of the two BLE enabled devices operates as the GATT server. The GATT server receives requests from the GATT client and sends responses back. It also sends server-initiated updates when configured to do so, and it is responsible for storing and making the user data available to the GATT client, organized in attributes.

FIG. 5 illustrates the processing unit 410 of the user device 400 implementing a GATT client functionality 412, the processing unit 510 of the BLE proxy device 500 implementing a GATT proxy server functionality 512 and the processing unit 110 of the environment controller 100 implementing a GATT server functionality 112.

The exchanges between the GATT client 412 and the GATT proxy server 512 are compliant with the GATT standard. The GATT proxy server 512 forwards the GATT requests received from the GATT client 412 to the GATT server 112. The GATT proxy server 512 does not process the GATT requests, which are processed by the GATT server 112. The GATT requests include the aforementioned environmental characteristic target values (e.g. target temperature, target humidity level, etc.). The GATT server 112 generates GATT responses (and optionally server-initiated GATT updates) to the GATT proxy server 512, which forwards them to the GATT client 412.

Although a single user device 400 is represented in FIG. 5 for simplification purposes, the GATT server 112 receives a plurality of GATT requests comprising a plurality of concurrent environmental characteristic target values originating from a plurality of GATT clients 412 executed by a plurality of user devices 400. The plurality of GATT requests is received and forwarded by one or more GATT proxy server 512 executed by one or more BLE proxy device 500 (a single BLE proxy device 500 is represented in FIG. 5 for simplification purposes).

A control module 114 executed by the processing units 110 of the environment controller 100 processes the plurality of concurrent environmental characteristic target values received by the GATT server 112, to generate the one or more command transmitted to the controlled appliance 300.

The GATT requests and GATT responses exchanged between the GATT server 112 and the GATT proxy server 512 do not rely on the lower protocol layers of the BLE standard, since the respective communication interfaces 130 and 530 of the environment controller 100 and BLE proxy device 500 do not support the BLE standard.

The GATT requests and GATT responses exchanged between the GATT server 112 and the GATT proxy server 512 are embedded in other protocol(s) (e.g. Hyper Text Transfer Protocol (HTTP), proprietary protocol, etc.) compatible with the respective communication interfaces 130 and 530 of the environment controller 100 and BLE proxy device 500.

The configuration illustrated in FIG. 5 comprising a GATT server 112 and a GATT proxy server 512 is for illustration purposes only. Other configurations may be implemented for relaying the environmental characteristic target values (comprised in the GATT requests generated by the GATT client 412) from the BLE proxy device 500 to the environment controller 100. For example, the processing unit 110 of the environment controller 100 does not execute the GATT server 112, which is executed by the processing unit 510 of the BLE proxy device 500 instead of the GATT proxy server 512. In this case, the environmental characteristic target values are extracted from the GATT requests received from the GATT client 412 by the GATT server executed by the BLE proxy device 500. Then, the extracted environmental characteristic target values are directly transmitted (without the original GATT requests) via another protocol (e.g. Hyper Text Transfer Protocol (HTTP), proprietary protocol, etc.) to the environment controller 100. For instance, the environment controller 100 executes a web server and the BLE proxy device 500 executes a web client for transmitting the environmental characteristic target values from the BLE proxy device 500 to the environment controller 100.

Figure 6:
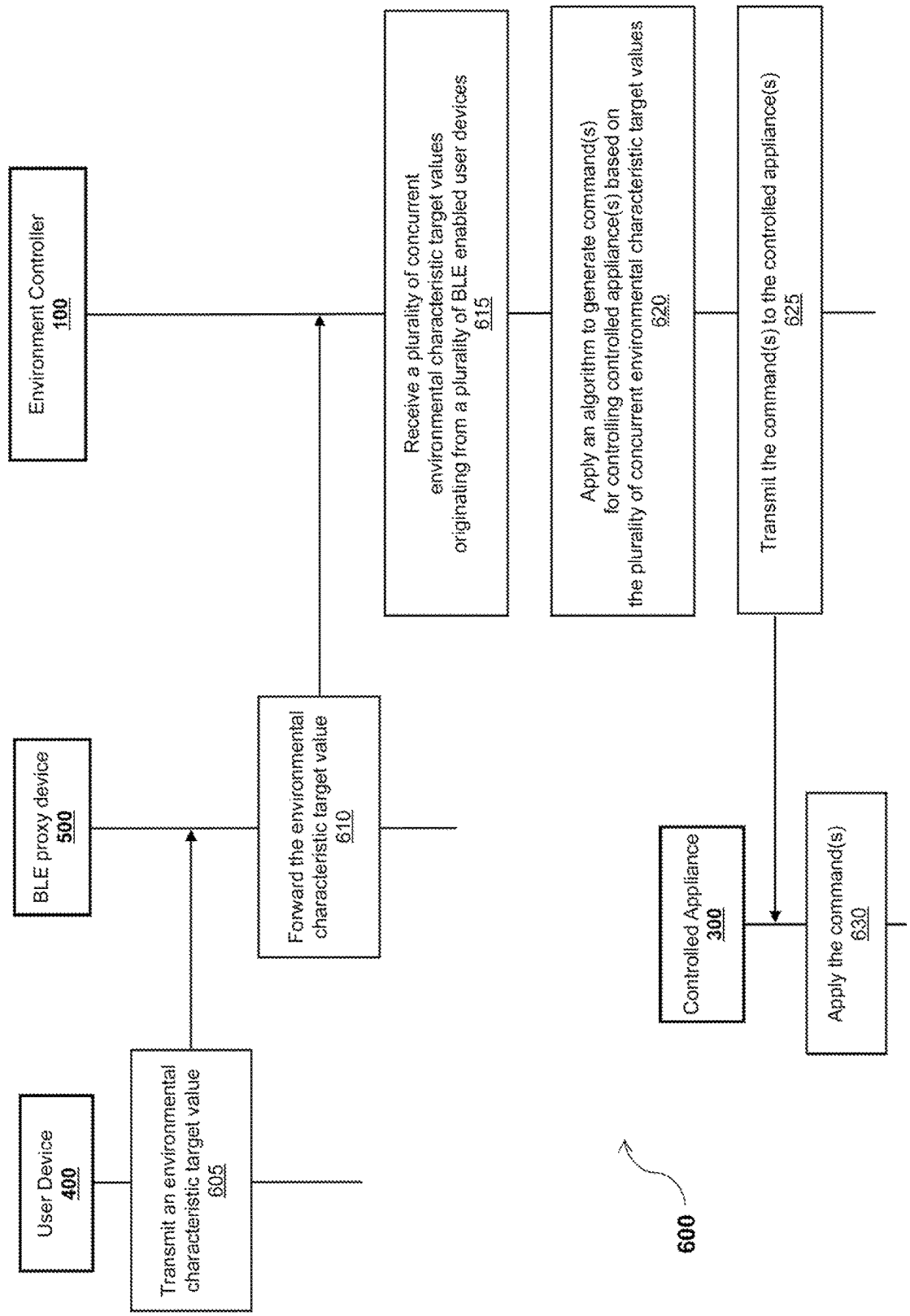
FIG. 6 represents a method implemented by devices of the environment control system of FIGS. 1-5 for controlling an environmental characteristic in an area based on concurrent BLE requests.

Reference is now made more specifically to FIGS. 4 and 6. At least some of the steps of the method 600 represented in FIG. 6 are implemented by the environment controller 100, to control an environmental characteristic in an area based on concurrent BLE requests.

A dedicated computer program has instructions for implementing at least some of the steps of the method 600. The instructions are comprised in a non-transitory computer program product (e.g. the memory 120) of the environment controller 100. The instructions provide for controlling an environmental characteristic in an area based on concurrent BLE requests, when executed by the processing unit 110 of the environment controller 100. The instructions are deliverable to the environment controller 100 via an electronically-readable media such as a storage media (e.g. CD-ROM, USB key, etc.), or via communication links (e.g. via a communication network through the communication interface 130).

The method 600 comprises the step 605 of transmitting (using the BLE protocol) an environmental characteristic target value to the BLE proxy device 500 via the BLE interface 460 of the user device 400. Step 605 is performed by the processing unit 410 of the user device 400.

The method 600 comprises the step 610 of forwarding the environmental characteristic target value to the environment controller 100. Step 610 is performed by the processing unit 510 of the BLE proxy device 500. Step 610 comprises receiving (using the BLE protocol) the environmental characteristic target value from the user device 400 via the BLE interface 560; and transmitting the environmental characteristic target value to the environment controller 100 via the communication interface 530.

At least one other user device 400 (not represented in FIG. 6 for simplification purposes) performs step 605. A corresponding BLE proxy device 500 (the one represented in FIG. 6 or another one not represented in FIG. 6 for simplification purposes) performs step 610.

The method 600 comprises the step 615 of receiving a plurality of concurrent environmental characteristic target values originating from a plurality of BLE enabled user devices 400. Step 615 is performed by the processing unit 110 of the environment controller 100. The plurality of concurrent environmental characteristic target values is received via the communication interface 130 of the environment controller 100 from one or more BLE proxy device 500. Some of the plurality of concurrent environmental characteristic target values may be received via another communication interface (not represented in FIG. 4).

The concurrent environmental characteristic target values received at step 615 correspond to the environmental characteristic target values transmitted at step 605 and forwarded at step 610.

The method 600 comprises the step 620 of applying an algorithm to generate one or more command for controlling at least one controlled appliance 300 based on the plurality of concurrent environmental characteristic target values received at step 615. Step 620 is performed by the processing unit 110 of the environment controller 100. A single or a plurality of commands is generated for controlling a single controlled appliance 300. Alternatively, a plurality of commands is generated for controlling a plurality of controlled appliances 300.

The method 600 comprises the step 625 of transmitting the command(s) (generated at step 620) to the controlled appliance(s) 300. Step 625 is performed by the processing unit 110 of the environment controller 100. The one or more command is transmitted via the communication interface 130 of the environment controller 100. Some of the one or more command may be transmitted via another communication interface (not represented in FIG. 4). The term command shall be interpreted broadly as comprising the command only (e.g. open a valve), or the command with one or more associated parameters (e.g. set the rotation speed at 15 rotations per second).

The step of receiving the command(s) via a communication interface of the controlled appliance 300 is not represented in FIG. 6 for simplification purposes.

The method 600 comprises the step 630 of applying the command(s) (transmitted at step 625) by a controlled appliance 300. Step 630 is performed by the processing unit (not represented in FIG. 4 for simplification purposes) of the controlled appliance 300. As mentioned previously, applying the command(s) comprises controlling the operations of one or more actuation modules (not represented in FIG. 4 for simplification purposes) of the controlled appliance 300.

Different algorithms can be implemented at step 620 of the method 600. Following are examples of these algorithms. The present disclosure is not limited to these exemplary algorithms; other algorithms may be implemented.

As mentioned previously, the plurality of concurrent environmental characteristic target values represents the same type of environmental characteristic. Examples of the plurality of concurrent environmental characteristic target values include: a plurality of target temperatures, a plurality of target humidity levels, a plurality of target CO2 levels, a plurality of target lightning levels, etc. For illustration purposes, the following examples of algorithms will be illustrated with target temperatures.

A first example of algorithm comprises calculating a mean value of the plurality of concurrent environmental characteristic target values; and generating the command(s) based on the mean value. For instance, three concurrent target temperatures are received at step 615: 20, 21 and 25 degrees Celsius. The mean value calculated at step 620 is 22 degrees Celsius. The command(s) generated at step 620 is (are) based on the mean value of 22 degrees Celsius. For example, command(s) are sent to a VAV appliance for regulating the temperature in the area at 22 degrees Celsius.

The calculated mean value may be rounded to the closest value among a pre-defined set of values. For example, the calculated mean temperature (e.g. 22.8 degrees Celsius) is rounded to the closest integer (e.g. 23). The command(s) generated at step 620 is (are) based on the rounded value (e.g. 23 instead of 22.8 degrees Celsius).

A second example of algorithm comprises selecting one value among the plurality of concurrent environmental characteristic target values; and generating the command(s) based on the selected value. Various types of criteria may be taken into consideration by the algorithm for selecting the value. For instance, three concurrent target temperatures are received at step 615: 20, 21 and 25 degrees Celsius. Furthermore, the environment controller 100 receives the current temperature (e.g. 19 degrees Celsius) of the area from a temperature sensor 200 located in the area. The selection may consist of the target temperature (20 degrees Celsius) closest to the current temperature (19 degrees Celsius), the target temperature (25 degrees Celsius) furthest from the current temperature (19 degrees Celsius), etc. The command(s) generated at step 620 is (are) based on the selected value (e.g. 19 degrees Celsius). For example, command(s) are sent to a VAV appliance for regulating the temperature in the area at 19 degrees Celsius.

A third example of algorithm may include features of the first and second exemplary algorithms. In a first step, a set of values are selected from or excluded from the plurality of concurrent environmental characteristic target values based on one or more criteria. In a second step, a mean value of the set of selected values is calculated. For instance, three concurrent target temperatures are received at step 615: 20, 21 and 25 degrees Celsius. Furthermore, the environment controller 100 receives the current temperature (e.g. 19 degrees Celsius) of the area from a temperature sensor 200 located in the area. The target temperatures which are more than 4 degrees Celsius above (or below) the current temperature (19 degrees Celsius) are excluded. Thus, the target temperature of 25 degrees Celsius is excluded, and the set of selected target temperatures comprises 20 and 21 degrees Celsius. Then, the mean value of 20 and 21 is calculated: 20.5. This value of 20.5 degrees Celsius is used for generating the command(s).

A fourth example of algorithm is adapted to the following specific configuration: a plurality of controlled appliances 300 are controlled via the commands generated at step 620.

The algorithm comprises selecting one or more value among the plurality of concurrent environmental characteristic target values and generating one or more command for controlling a first one among the plurality of controlled appliances 300 based on the one or more selected value.

The algorithm comprises selecting another one or more value among the plurality of concurrent environmental characteristic target values and generating one or more command for controlling a second one among the plurality of controlled appliances 300 based on the another one or more selected value.

More generally, if N controlled appliances 300 are controlled via the commands generated at step 620, then N selections (of one or more value among the plurality of concurrent environmental characteristic target values) are performed by the algorithm for each one of the N controlled appliances 300. Each one of the N selections is used for generating one or more command for controlling the corresponding controlled appliance 300.

For instance, two controlled appliances 300 are controlled via the commands generated at step 620; and three concurrent target temperatures are received at step 615: 20, 21 and 25 degrees Celsius.

A first selection for the first controlled appliance 300 comprises the target temperatures 20 and 21 degrees Celsius. The one or more command for controlling the first controlled appliance 300 is generated based on the target temperatures 20 and 21 degrees Celsius.

A second selection for the second controlled appliance 300 comprises the target temperature 25 degrees Celsius. The one or more command for controlling the second controlled appliance 300 is generated based on the target temperature 25 degrees Celsius.

The selections may be mutually exclusive (as illustrated in the previous example) or overlapping (e.g. the first selection comprises the target temperatures 20 and 21 degrees Celsius and the second selection comprises the target temperatures 21 and 25 degrees Celsius).

For each selection, a sub-algorithm is used for generating the one or more command for controlling the corresponding controlled appliance 300. For example, as previously described in reference to the first exemplary algorithm, a mean value of the values comprised in the selection is calculated. The one or more command is generated based on the calculated mean value.

For example, if the first selection comprises the target temperatures 20 and 21 degrees Celsius; then the mean temperature is 20.5 degrees Celsius and the one or more command (for controlling the first controlled appliance 300) is generated based on the calculated mean temperature of 20.5 degrees Celsius. Similarly, if the second selection comprises the target temperatures 21 and 25 degrees Celsius; then the mean temperature is 23 degrees Celsius and the one or more command (for controlling the second controlled appliance 300) is generated based on the calculated mean temperature of 23 degrees Celsius.

The selection of the one or more value (associated to a given controlled appliance 300) among the plurality of concurrent environmental characteristic target values is based on one or more criteria, which may vary based on a particular implementation of the algorithm.

Figure 7:
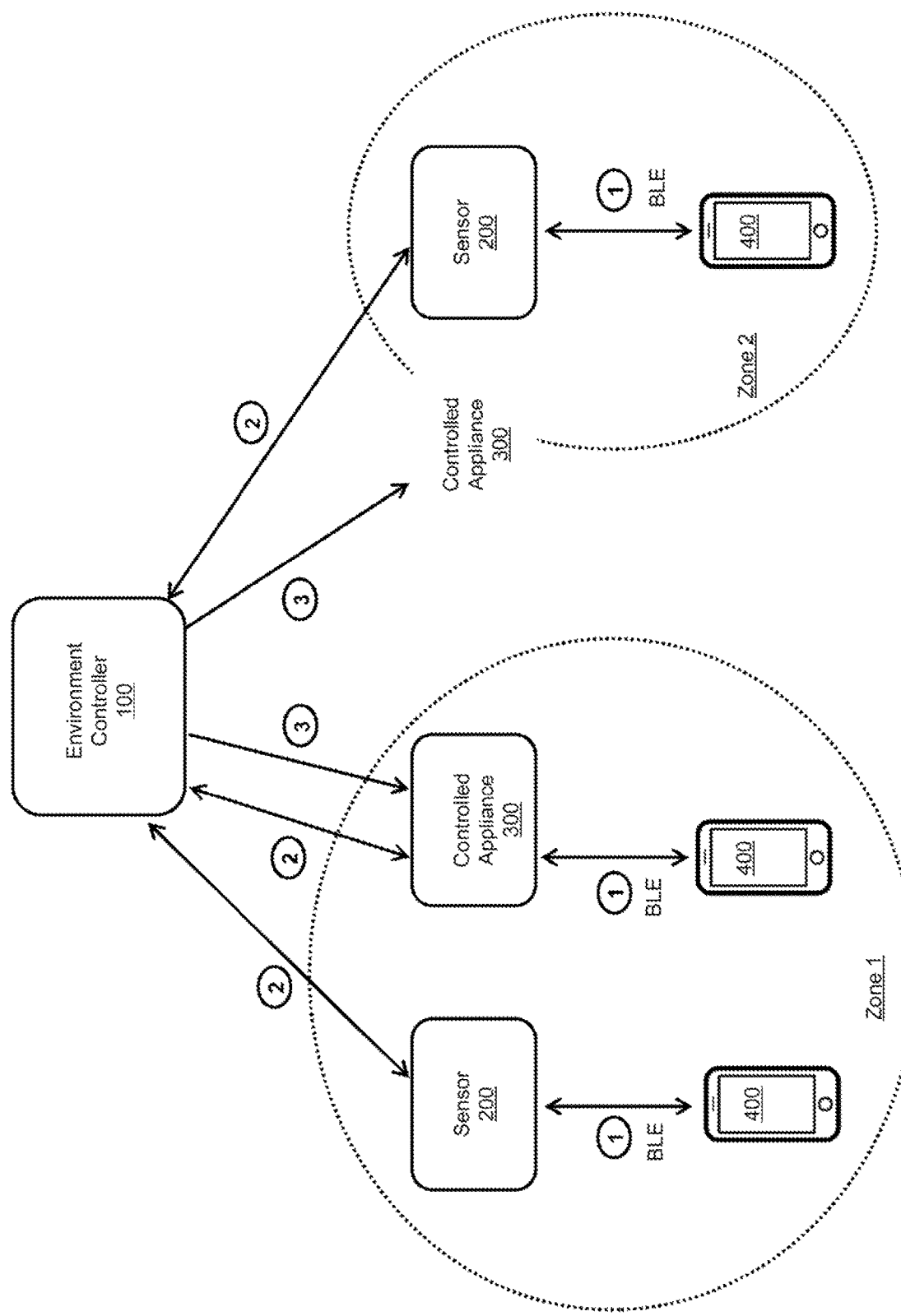
FIG. 7 illustrates interactions between devices of the environment control system for implementing an algorithm used when performing the method of FIG. 6.

Referring more specifically to FIG. 7, an exemplary implementation of the fourth algorithm is illustrated.

A plurality of zones is defined in the area under the control of the environment controller 100. Each zone is associated to a given controlled appliance 300. The environmental characteristic target values originating from BLE enabled user devices 400 located in a given zone are used to generate the command(s) for controlling the controlled appliance 300 associated to the given zone. A given zone is defined by one or more BLE proxy devices 500 (e.g. BLE enabled sensor 200 or BLE enabled controlled appliance 300) located in the zone. Thus, the given zone defines a localization of the BLE enabled user devices 400 capable of interacting with the BLE proxy devices 500 located in the given zone through the BLE protocol.

For illustration purposes only, two zones (zone 1 and zone 2) are represented in FIG. 7. A first controlled appliance 300 located within zone 1 is associated to zone 1. A second controlled appliance 300 located at the boundary of zone 2 is associated to zone 2. Zone 1 is defined by two BLE proxy devices 500 located in zone 1: a BLE enabled sensor 200 and a BLE enabled controlled appliance 300. Zone 2 is defined by one BLE proxy device 500 located in zone 2: a BLE enabled sensor 200. Two BLE enabled user devices 400 are located in zone 1; and are capable of interacting with the BLE enabled sensor 200 and the BLE enabled controlled appliance 300 located in zone 1 through the BLE protocol. One BLE enabled user device 400 is located in zone 2; and is capable of interacting with the BLE enabled sensor 200 located in zone 2 through the BLE protocol.

The environment controller 100 receives concurrent environmental characteristic target values from the three BLE enabled user devices 400 represented in FIG. 7. A first selection comprises the two environmental characteristic target values originating from the two BLE enabled user devices 400 located in zone 1. A second selection comprises the environmental characteristic target value originating from the BLE enabled user device 400 located in zone 2. The one or more command for controlling the controlled appliance 300 associated to zone 1 is based on the first selection. The one or more command for controlling the controlled appliance 300 associated to zone 2 is based on the second selection.

For example, the concurrent environmental characteristic target values consist of concurrent target temperatures. Zone 1 is closer to windows and zone 2 is farther away from windows. The average current temperature in zone 1 is 28 degrees Celsius and the average current temperature in zone 2 is 24 degrees Celsius. The perception of persons located in zone 1 is that the temperature is always too high and should be reduced significantly. The perception of persons located in zone 2 is that the temperature is always a bit too low and should be raised a little bit. Thus, the two BLE enabled user devices 400 located in zone 1 transmit BLE requests with a target temperature of respectively 21 and 22 degrees Celsius. The BLE enabled user device 400 located in zone 2 transmits a BLE request with a target temperature of 25 degrees Celsius.

If the first exemplary algorithm was applied, a mean temperature of 22.7 ($(21+22+25)/3$) would be calculated, and the two controlled appliances 300 would be triggered to adjust the temperature to 23 degrees Celsius. This would probably satisfy the person who requested a target temperature of 22 degrees Celsius; but would probably not satisfy the persons who respectively requested a target temperature of 21 and 25 degrees Celsius.

By applying the fourth exemplary algorithm, a first selection comprises the target temperatures 21 and 22 degrees Celsius for zone 1, and a second selection comprises the target temperature 25 degrees Celsius for zone 2.

The controlled appliance 300 located in zone 1 is triggered to adjust the temperature to 21.5 degrees Celsius (mean value of the target temperatures of the first selection); and the controlled appliance 300 located in zone 2 is triggered to adjust the temperature to 25 degrees Celsius (the second selection comprises a single target temperature). In this case, there is a great chance that the two persons located in zone 1 and the person located in zone 2 will all be satisfied with the independent adjustments of temperature in the two zones.

As illustrated in the second exemplary algorithm, the algorithm applied by the method 600 at step 620 may take into consideration one or more environmental characteristic measured value (transmitted by sensor(s) 200) in addition to the plurality of concurrent environmental characteristic target values for generating the one or more commands. Examples of environmental characteristic measured values include a measured temperature, a measured humidity level, a measured $CO_2$ level, a measured lightning level, an occupancy of the area, etc.

The environmental characteristic measured values are of the same type (e.g. temperature) than the concurrent environmental characteristic target values (e.g. temperature). Alternatively, the environmental characteristic measured values are of a different type (e.g. temperature) than the concurrent environmental characteristic target values (e.g. lightning level). In still another alternative, the environmental characteristic measured values include the same and different type(s) (e.g. temperature and humidity level) than the concurrent environmental characteristic target values (e.g. temperature).

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller for controlling an environmental characteristic in an area based on concurrent short range wireless interactions, the environment controller comprising:
   at least one communication interface;
   a processing unit for:
      receiving via the at least one communication interface a plurality of concurrent environmental characteristic target values originating from a plurality of short range wireless enabled user devices, the plurality of concurrent environmental characteristic target values being forwarded from the plurality of short range wireless enabled user devices to the environment controller via one or more short range wireless enabled proxy device;
      applying an algorithm to generate one or more command for controlling at least one controlled appliance based on the plurality of concurrent environmental characteristic target values; and
      transmitting the one or more command to the at least one controlled appliance via the at least one communication interface.

2. The environment controller of claim 1, wherein the plurality of concurrent environmental characteristic target values comprises one of the following: a plurality of target temperatures, a plurality of target humidity levels, a plurality of target CO2 levels and a plurality of target lightning levels.

3. The environment controller of claim 1, wherein the algorithm further takes into consideration at least one environmental characteristic measured value for generating the one or more command.

4. The environment controller of claim 3, wherein the at least one environmental characteristic measured value comprises one of the following: a measured temperature, a measured humidity level, a measured CO2 level, a measured lightning level and an occupancy of the area.

5. The environment controller of claim 1, wherein applying the algorithm comprises calculating a mean value of the plurality of concurrent environmental characteristic target values and generating the one or more command based on the mean value.

6. The environment controller of claim 1, wherein applying the algorithm comprises selecting one value among the plurality of concurrent environmental characteristic target values and generating the one or more command based on the selected value.

7. The environment controller of claim 1, wherein the at least one controlled appliance consists of a plurality of controlled appliances; and applying the algorithm comprises selecting one or more value among the plurality of concurrent environmental characteristic target values and generating one or more command for controlling one among the plurality of controlled appliances based on the one or more selected value.

8. The environment controller of claim 7, wherein the selected one or more value originates from one or more among the plurality of short range wireless enabled user devices, the one or more among the plurality of short range wireless enabled user devices being located in a given zone within the area.

9. The environment controller of claim 8, wherein the one or more short range wireless enabled proxy device consists of a plurality of short range wireless enabled proxy devices, the given zone is defined by at least one among the plurality of short range wireless enabled proxy devices, and the one or more among the plurality of short range wireless enabled user devices located in the given zone is capable of interacting with the at least one among the plurality of short range wireless enabled proxy devices through a short range wireless protocol.

10. The environment controller of claim 7, wherein applying the algorithm further comprises selecting another one or more value among the plurality of concurrent environmental characteristic target values and generating one or more command for controlling another one among the plurality of controlled appliances based on the another one or more selected value.

11. A method for controlling an environmental characteristic in an area based on concurrent short range wireless interactions, the method comprising:
   receiving by a processing unit of an environment controller via at least one communication interface of the environment controller a plurality of concurrent environmental characteristic target values originating from a plurality of short range wireless enabled user devices, the plurality of concurrent environmental characteristic target values being forwarded from the plurality of short range wireless enabled user devices to the environment controller via one or more short range wireless enabled proxy device;
   applying by the processing unit of the environment controller an algorithm to generate one or more command for controlling at least one controlled appliance based on the plurality of concurrent environmental characteristic target values; and
   transmitting by the processing unit of the environment controller the one or more command to the at least one controlled appliance via the at least one communication interface of the environment controller.

12. The method of claim 11, wherein the plurality of concurrent environmental characteristic target values comprises one of the following: a plurality of target temperatures, a plurality of target humidity levels, a plurality of target CO2 levels and a plurality of target lightning levels.

13. The method of claim 11, wherein the algorithm further takes into consideration at least one environmental characteristic measured value for generating the one or more command.

14. The method of claim 11, wherein applying the algorithm comprises calculating a mean value of the plurality of concurrent environmental characteristic target values and generating the one or more command based on the mean value.

15. The method of claim 11, wherein applying the algorithm comprises selecting one value among the plurality of concurrent environmental characteristic target values and generating the one or more command based on the selected value.

16. The method of claim 11, wherein the at least one controlled appliance consists of a plurality of controlled appliances; and applying the algorithm comprises selecting one or more value among the plurality of concurrent environmental characteristic target values and generating one or more command for controlling one among the plurality of controlled appliances based on the one or more selected value.

17. The method of claim 16, wherein the selected one or more value originates from one or more among the plurality of short range wireless enabled user devices, the one or more among the plurality of short range wireless enabled user devices being located in a given zone within the area.

18. The method of claim 17, wherein the one or more short range wireless enabled proxy device consists of a plurality of short range wireless enabled proxy devices, the given zone is defined by at least one among the plurality of short range wireless enabled proxy devices, and the one or more among the plurality of short range wireless enabled user devices located in the given zone is capable of interacting with the at least one among the plurality of short range wireless enabled proxy devices through a short range wireless protocol.

19. The method of claim 11, wherein the plurality of concurrent environmental characteristic target values is transmitted from the plurality of short range wireless enabled user devices to the one or more short range wireless enabled proxy device through a short range wireless protocol.

20. A non-transitory computer program product comprising instructions executable by a processing unit of an environment controller, the execution of the instructions by the processing unit of the environment controller providing for controlling an environmental characteristic in an area based on concurrent short range wireless interactions by:

receiving by the processing unit of the environment controller via at least one communication interface of the environment controller a plurality of concurrent environmental characteristic target values originating from a plurality of short range wireless enabled user devices, the plurality of concurrent environmental characteristic target values being forwarded from the plurality of short range wireless enabled user devices to the environment controller via one or more short range wireless enabled proxy device;

applying by the processing unit of the environment controller an algorithm to generate one or more command for controlling at least one controlled appliance based on the plurality of concurrent environmental characteristic target values; and transmitting by the processing unit of the environment controller the one or more command to the at least one controlled appliance via the at least one communication interface of the environment controller.

* * * * *